United States Patent [19]

Gratzl

[11] Patent Number: 5,243,369
[45] Date of Patent: Sep. 7, 1993

[54] FILM CASSETTE

[75] Inventor: Rudolf Gratzl, Munich, Fed. Rep. of Germany

[73] Assignee: Arnold & Richter Cine Technik GmbH & Co., Munich, Fed. Rep. of Germany

[21] Appl. No.: 671,882
[22] PCT Filed: Sep. 29, 1989
[86] PCT No.: PCT/DE89/00631
 § 371 Date: Mar. 27, 1991
 § 102(e) Date: Mar. 27, 1991
[87] PCT Pub. No.: WO90/04206
 PCT Pub. Date: Apr. 19, 1990

[30] Foreign Application Priority Data

Oct. 5, 1988 [DE] Fed. Rep. of Germany ....... 3833826
Jan. 20, 1989 [DE] Fed. Rep. of Germany ....... 3901547

[51] Int. Cl.⁵ .............................................. G03B 23/02
[52] U.S. Cl. .................... 352/78 R; 352/156; 242/193; 242/194
[58] Field of Search ............ 352/156, 78 R; 242/193, 242/194; 206/316.1, 316.2

[56] References Cited

U.S. PATENT DOCUMENTS

| 1,428,480 | 9/1922 | Giroux . | |
| 1,708,087 | 4/1929 | Friess | 352/156 |
| 2,476,705 | 7/1949 | Coutant et al. | 352/156 |
| 3,278,252 | 10/1966 | Wagner et al. | 352/72 |
| 3,398,909 | 8/1968 | Jotzoff | 242/193 |
| 3,537,780 | 11/1970 | Angenieux | 352/78 R |
| 3,719,417 | 3/1973 | Lecoeur | 352/78 R |
| 3,829,203 | 8/1974 | Novak | 352/156 |

FOREIGN PATENT DOCUMENTS 1458630 10/1966 France .

Primary Examiner—Monroe H. Hayes
Attorney, Agent, or Firm—Fish & Richardson

[57] ABSTRACT

Film cassette with a housing in which a film supply container and a film takeup container are provided in housing halves 11, 12 arranged side by side to receive an exposed and unexposed film, a cassette window mountable on the film guide surface of a motion picture camera, and a cassette drive. Between housing halves 11, 12, a turning loop device 2 is arranged in which the film is guided from one housing half 11 to the other housing half 12.

13 Claims, 3 Drawing Sheets

FILM CASSETTE

The invention relates to a film cassette.

Film cassettes are known with sequentially arranged housing parts to receive the film supply reel as well as the film takeup reel, said cassettes optionally having their own drive or a drive couplable with the drive motor of the motion picture camera. A window-shaped opening serves to conduct the film from the film cassette to the motion picture camera, where it is exposed and then conveyed past the window back into the film cassette. A gasket between the film cassette and the motion picture camera provides a light-tight transition. The link between the film cassette and motion picture camera is provided by a locking device which permits a releasable coupling between the film cassette and the motion picture camera.

One disadvantage of known film cassettes with sequentially arranged housing parts to receive the film supply container and film takeup container consists in their considerable lengthwise dimensions, which can pose problems especially with long film lengths. For this reason, film cassettes with housing halves arranged side by side have been produced in which the housing halves to receive the film supply container and the film takeup container are arranged side by side, resulting in a limited structural length of the film cassette. The greater width of the film cassette generally does not pose a problem since the motion picture camera has a minimum width in any event.

However, the problem with film cassettes with housing halves mounted side by side is the guidance of the film in the vicinity of the cassette window, so that there is a risk of the film being damaged, considerable noise being generated, and the film jamming in the vicinity of the deflecting device.

FR-A-1,458,630 teaches a motion picture camera with a film cassette, which consists of a one-piece housing with a film supply reel and a film takeup reel to receive the exposed or unexposed film. In addition, the motion picture camera has a film path with a cassette window and a cassette drive. To guide the film from the film supply reel to the film takeup reel, a manually producible turning loop is provided by which the film is twisted through 360°. This manual turning loop must be produced each time a cassette is connected to or disconnected from the motion picture camera so that the film is guided from the film supply reel to the film takeup reel which is arranged coaxially with respect to the film supply reel. This results in inadvertent exposure of considerable film lengths and to a cumbersome and time-consuming procedure.

The goal of the invention is to provide a film cassette of the species recited at the outset, in which the film is transported from one housing half to the other housing half of the film cassette with limited friction and hence limited noise production and without risk of jamming or damage to the surface of the film and in which the film is guided from the film supply reel to the film takeup reel without manual intervention.

The solution according to the invention ensures a gentle, nearly noise-free, and safe transport of the film from one housing half to the cassette window and via the motion picture camera back to the other cassette half with minimum friction and without twisting or crossing of the film relative to the film plane and permits automatic guidance of the film from the film supply reel to the film takeup real located coaxially with respect to the film supply reel, so that no inadvertent exposure of the film occurs, and simple and safe handling is ensured.

One advantageous improvement on the solution according to the invention is characterized by the fact that the turning loop device consists of a shell against which the outer surface of the film abuts and which has a uniform twist of 360°, with the film inlet and outlet being arranged so that the side edges of the film enter the sleeve parallel to one another and emerge from the sleeve in the same manner. This design of the solution according to the invention ensures that the outer surface of the film abuts the sleeve while maintaining sufficient stiffness of the film, thus guaranteeing smooth guidance and twisting of the film from the film inlet to the film outlet with simultaneously ensured parallel guidance of the side edges of the film in the vicinity of the film inlet and outlet.

Another advantageous embodiment of the solution according to the invention is characterized by the fact that the turning loop device consists of a mandrel against which the inner surface of the film abuts and which has a uniform twist of 360°, with the film inlet and film outlet being arranged so that the side edges of the film run parallel to one another. In this version of the solution according to the invention as well, exact guidance and turning of the film with minimum surface stress and hence minimum noise is ensured, whereby the shape of the turning loop device guarantees parallel side edges of the film in the area of the film inlet and outlet.

Another advantageous embodiment of the solution according to the invention is characterized by the fact that the turning loop device consists of a film channel with a mandrel insertable in a sleeve, against which the inner and outer surfaces of the film abut and which has a uniform spiral of 360°, and by the fact that the film inlet and outlet are arranged so that the side edges of the film run parallel to one another. In this combined solution, the film is guided in the manner of a film channel between a sleeve and a mandrel insertable in the sleeve, whereby the sleeve and mandrel are separable, so that it is easy to clean them. This version of the solution is characterized by its universal applicability to films of a wide variety of different types.

In another advantageous embodiment, the turning device has contact edges which are so designed that only the perforated edges of the film are guided and the image area is guided in a contact-free manner through the turning loop device. This feature of the solution avoids damage, especially scratching of the surface, when there are particles in the vicinity of the turning loop device and simultaneously provides a significant reduction in the amount of noise as the film is guided.

Another advantageous embodiment of the solution according to the invention is characterized by the fact that the turning loop device is designed as a light trap and forms a light-tight seal for each housing half. The design of the turning loop device as a light trap ensures a light-tight seal between the two housing halves so that both housing halves can be open to insert or remove the film takeup container or film supply container without the risk of stray light entering the other housing half. This makes the cassette suitable as a daylight cassette, which allows film to be inserted and removed under other than darkroom conditions.

Another advantageous embodiment of the solution according to the invention is characterized by the fact that the diameter and pitch of the turning loop device are so designed that the film is guided with its natural curvature through the turning loop device. In this embodiment of the turning loop device, the natural twist or natural curvature of the film is utilized and an appropriate twist is given that ensures that the film is neither rotated nor crossed in the film plane.

In one advantageous improvement on the solution according to the invention, at least one sprocket engaging the film perforations is provided in the vicinity of the film inlet and film outlet of the turning loop device, with both sprockets being coupled to one another in the vicinity of the inlet and outlet sides in such fashion that the film is kept at a constant length inside the turning loop device.

This device which turns passively with the film ensures that the film is not pulled and caught in the vicinity of the turning loop device as a result of nonuniform film tension so that it jams, which could lead to damage or tearing of the film. Moreover, the spacing sprockets that are coupled together increase the sliding ability of the film within the turning loop device, since the constant length between the film inlet and outlet can be dimensioned so that there are minimum contact surfaces where the film contacts the turning loop device.

Advantageous embodiments and improvements on the invention are characterized in the subclaims.

The invention will now be described with reference to the embodiments shown in the drawings in greater detail.

Figure 1:
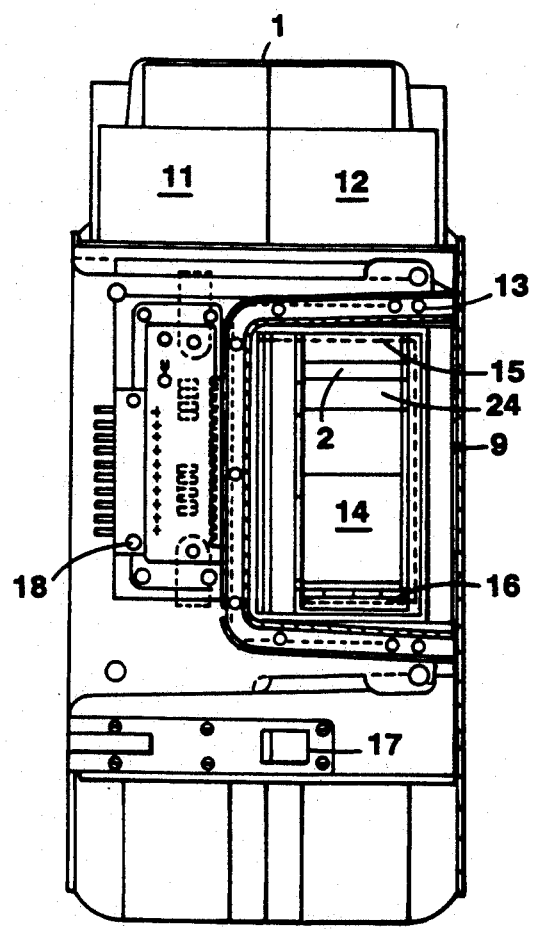
FIG. 1 is a cross section through a film cassette with housing halves located side by side.

FIG. 1 is a top view of a film cassette with a housing 1, which has housing halves 11 and 12 located side by side to receive a film takeup container and a film supply container. The view shown in FIG. 1 is directed at the area of the cassette window of the cassette according to the view X in FIG. 5 and shows cassette window 9 which can be sealed off by a gasket 13 from the film path of the motion picture camera. Film path 14 of cassette window 9 has two film channels 15 and 16 through which the film emerges on the takeup side of film cassette 12 or in film outlet 24 of one end of turning loop device 2.

The mechanical connection between the film cassette and a motion picture camera is provided by a locking device 17, while an electrical connection is provided by contact device 18.

Figure 2:
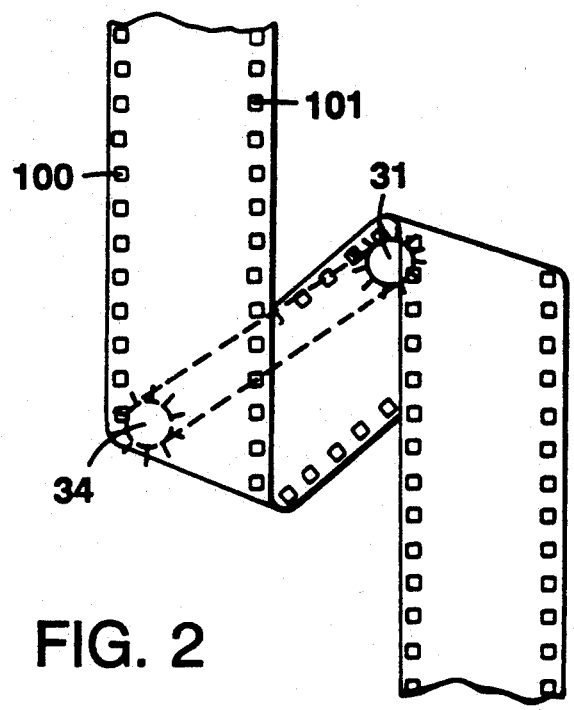
FIG. 2 is a perspective view of a twisted film part.

FIG. 2 shows a portion of a film 10 with laterally perforated edges, whose central part has a shape which it assumes when a film wound on a reel is unwound and drops freely. Twisting of film 10 then occurs, resulting from the bending of the film in the rolled up state. This "natural" twisting of film 10 is utilized in the following by providing the turning loop device according to FIG. 3.

Figure 3:
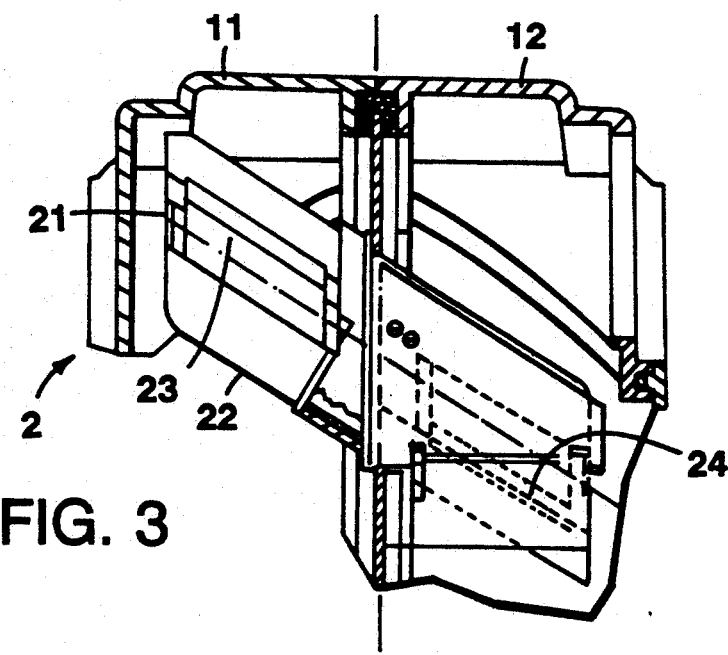
FIG. 3 is a section through the film cassette in the vicinity of the turning loop device.

FIG. 3 shows a section through the film cassette in the vicinity of the turning loop device, which is not shown cut.

Turning loop device 2 is disposed lying diagonally in the cassette between housing halves 11 and 12 of the film cassette and has a film inlet 23 in the vicinity of housing half 11 as well as a film outlet 24 in the vicinity of the other housing half 12. The twist in turning loop device 2 corresponds to the twist in film 10 according to FIG. 2 and is caused by a suitable guide path in a sleeve or on a mandrel.

In the embodiment according to FIG. 3, the turning loop device consists of a film channel which causes the film to be twisted through an angle of 360°, which in the present embodiment is brought about by a sleeve 22 and a mandrel or insert 21, while sleeve 22 and mandrel 21 can be separated, with insert 21 being inserted into sleeve 22.

Between the inner surface of sleeve 22 and the outer surface of mandrel 21, a path is formed which matches the width of the film and through which the film is conducted from one housing half 11 to the other housing half 12. Film 10 is then guided essentially in the vicinity of perforated edges 100, 101 according to FIG. 2 by contact edges which are provided on the edge of the film channel on the inside of sleeve 22 and on the outside of mandrel 21.

Dividing turning loop device 2 by a mandrel insertable in sleeve 22 is designed primarily for cleaning turning loop device 2 so that abraded particles can be removed easily without tedious and time-consuming cleaning of turning loop device 2 being necessary.

In addition to this embodiment it is also possible to bring about the 360° twist exclusively with the aid of a sleeve or a mandrel.

Figure 4:
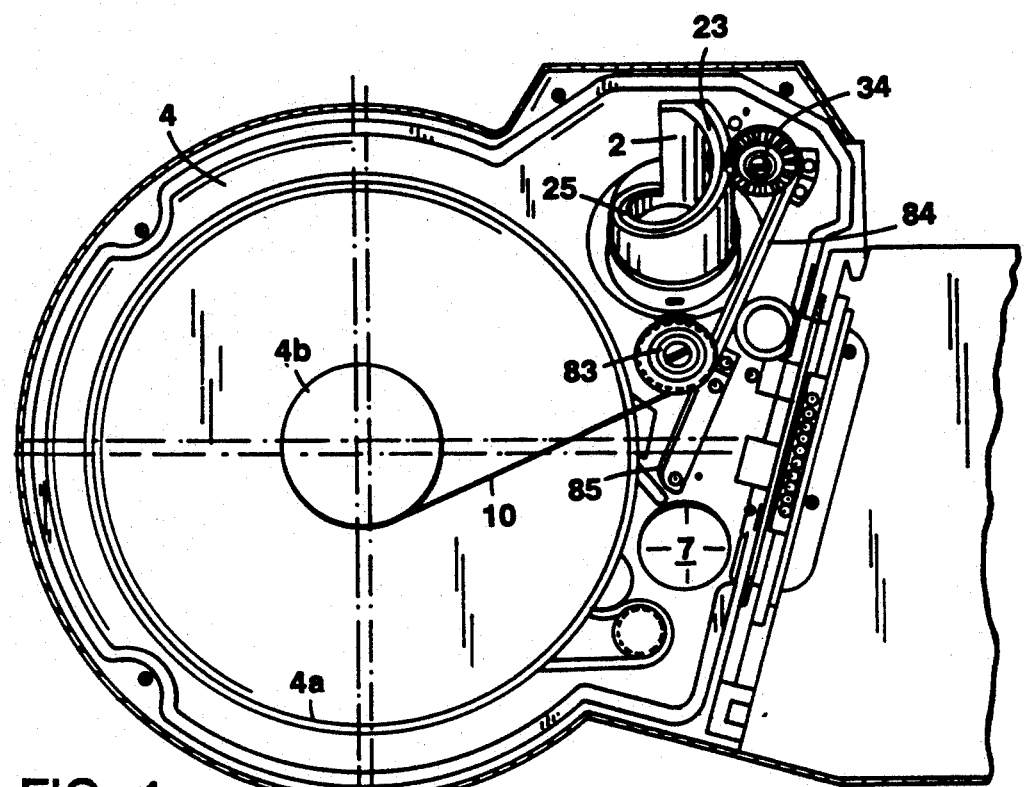
FIG. 4 is a lengthwise section through the film cassette showing the film supply side of the film cassette.
Figure 5:
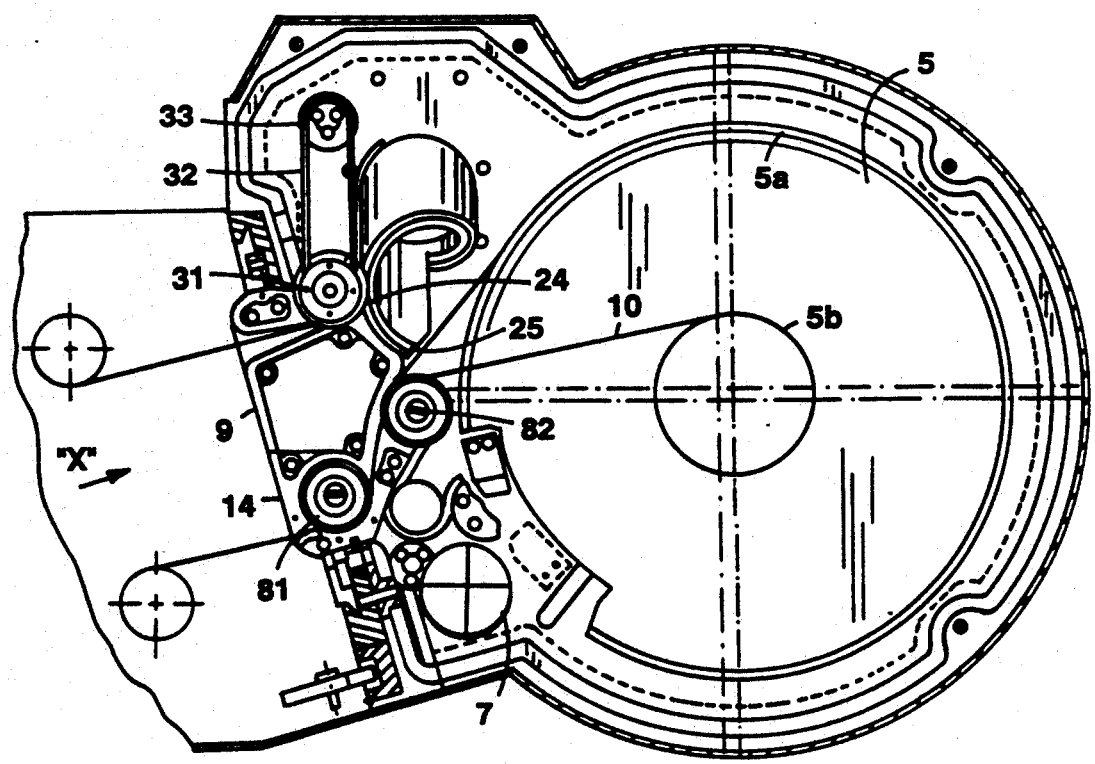
FIG. 5 is a lengthwise section through the film cassette showing the film takeup side of the film cassette.

FIGS. 4 and 5 show more clearly the structure of the turning loop device as well as the film guidance in the vicinity of the two housing halves.

FIG. 4 is a lengthwise section through the film cassette, looking at film supply container 4, shows the guidance of film 10 in the vicinity of one housing half. The film travels from film supply roll 4 with maximum film diameter 4a and minimum film diameter 4b over deflecting roller 83 and film guides 84, 85 to a first spacing sprocket 34 in the vicinity of film inlet 23 of turning loop device 2.

FIG. 4 shows the configuration of turning loop device 2 as well as the arrangement of contact edges 25 to support the film perforations.

Film 10 is conducted into the film inlet of turning loop device 2 by spacing sprocket 34, which has the film wrapped around it and deflected accordingly; in device 2 the film is twisted 360° corresponding to its natural twist and guided over the film outlet of turning loop device 2 to cassette window 9 as shown in FIGS. 1 and 5.

FIG. 5 shows a section through the film cassette looking at the film takeup side of the film cassette with film takeup container 5 located therein.

Film 10 goes from film supply container 4 as shown in FIG. 4 through turning loop device 2 to the film outlet of turning loop device 2 where its perforated edge is engaged by spacing sprocket 31. From here, film 10 passes through cassette window 9 into the motion picture camera, where it is transported through the gate by deflecting rollers and a transport claw.

Then the film again passes through cassette window 9 and over deflecting rollers 81, 82 to film takeup container 5, where it is wound up from minimum diameter 5b to maximum diameter 5a.

The cassette drive is provided by a motor 7 whose control signals are output through an electrical connection 18 from the motion picture camera.

Spacing sprocket 31 has teeth distributed around its circumference, the distance between the teeth matching the width of the perforations in the film. Spacing sprocket 31 is connected to a gear 33 by a synchronizing element, which in the present embodiment consists of a toothed belt 32, said gear being coupled with spacing sprocket 34 as shown in FIG. 4.

The solid coupling between spacing sprockets 31 and 34 and their positive connection to the film perforations ensures that the film maintains a constant length in the vicinity of turning loop device 2, so that it will not be pulled or caught as a result of unequal drive or different amounts of pull on the takeup and supply sides of the film cassette.

FIG. 5 shows contact edge 25 of turning loop device 2 with whose aid film 10 can be guided exclusively in the area of the perforated edges, so that the surface of the film travels in the vicinity of the frames, i.e. inside perforated edges 100, 101 as shown in FIG. 2 with zero contact through turning loop device 2. As a result the surface of the film is protected and the limited contact surface ensures that a minimum amount of noise is generated during film transport.

Figure 6:
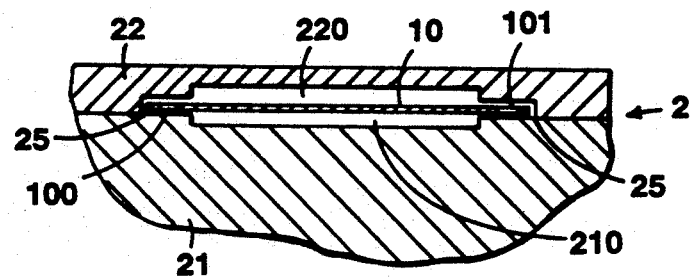
FIG. 6 is a section through the turning loop channel.

FIG. 6 shows a section through the turning loop channel and illustrates the guidance of a film 10 inside turning loop device 2.

The outer surface of mandrel 21 as well as that of sleeve 22, between which film 10 is guided inside turning loop device 2, has a recess 210 or 220 in the vicinity of the gate of film 10 so that it is only the perforated edges 100 and 101 of film 10 that contact the outer surfaces 21 and 22 of the sleeve or mandrel of turning loop device 2.

This special design of the turning loop channel not only guarantees reduced noise but also zero-contact guidance of the film in the image area, so that no scratching of the surface of the film in the vicinity of the image content can occur. The depth of recesses 210 and 220 is dimensioned so that zero contact guidance of film 10 in the entire area of the turning loop channel is ensured and sufficient guidance of the film is ensured at the same time.

The invention is not limited in its design to the preferred embodiment described above. Rather, a number of variations are possible, which make use of the solution shown, even though the embodiments are fundamentally very different.

I claim:

1. Film cassette with a housing in which a film supply container and a film takeup container are provided in housing halves arranged side by side to receive an exposed and unexposed portion of a film, a cassette window provided in a film path and mountable on the film entrance opening of a motion picture camera, a cassette drive, and a turning loop device provided in said film path between said cassette window and one of said film containers for guiding said film from one housing half via a film inlet of said turning loop device to a film outlet of said turning loop device leading to the other housing half, said turning loop device consisting of a sleeve and a mandrel insertable into said sleeve against which the inner and outer surfaces of said film abut, said sleeve having a uniform twist of 360°, and said film inlet and film outlet being arranged so that the side edges of the part of said film entering said turning loop device run parallel to the side edges of the part of said film emerging from said turning loop device.

2. The film cassette of claim 1 wherein said turning loop device has contact edges such that only perforated edges of said film are guided and the image area of said film is guided with zero contact through said turning loop device.

3. The film cassette of either claim 1 or 2 wherein said turning loop device is in the form of a light trap and forms a light-tight seal for each said housing half.

4. The film cassette of either claim 1 or 2 wherein the diameter and pitch of said turning loop device are such that said film is guided with its natural curvature through said turning loop device.

5. The film cassette of claim 1 and further including at least one spacing sprocket engaging film perforations located in the vicinity of each of said film inlet and said film outlet of said turning loop device, and structure coupling said spacing sprockets together such that film is kept at a constant length inside said turning loop device.

6. The film cassette of claim 5 wherein said coupling structure includes synchronizing structure for maintaining a constant film length in the vicinity of said turning loop device.

7. The film cassette of claim 6 wherein each said spacing sprocket includes a gear and said synchronizing structure includes a toothed belt connecting said gear of one of said spacing sprockets with said gear of the other of said spacing sprocket.

8. The film cassette of claim 1 wherein said turning loop device extends diagonally from one of said housing halfs to the other said housing half in the cross section of said housing.

9. The film cassette of claim 8 wherein said turning loop device has contact edges such that only perforated edges of said film are guided and the image area of said film is guided with zero contact through said turning loop device.

10. The film cassette of claim 9 wherein the diameter and pitch of said turning loop device are such that said film is guided with its natural curvature through said turning loop device.

11. The film cassette of claim 10 and further including at least one spacing sprocket engaging film perforations located in the vicinity of each of said film inlet and said film outlet of said turning loop device, and structure coupling said spacing sprockets together such that film is kept at a constant length inside said turning loop device.

12. The film cassette of claim 11 wherein said coupling structure includes synchronizing structure for maintaining a constant film length in the vicinity of said turning loop device.

13. The film cassette of claim 12 wherein each said spacing sprocket includes a gear and said synchronizing structure includes a toothed belt connecting said gear of one of said spacing sprockets with said gear of the other of said spacing sprocket.

* * * * *